June 2, 1925.
F. E. HUTCHINGS
AUTOMOBILE BUMPER
Filed March 6, 1922
1,540,011
Fig. 1.
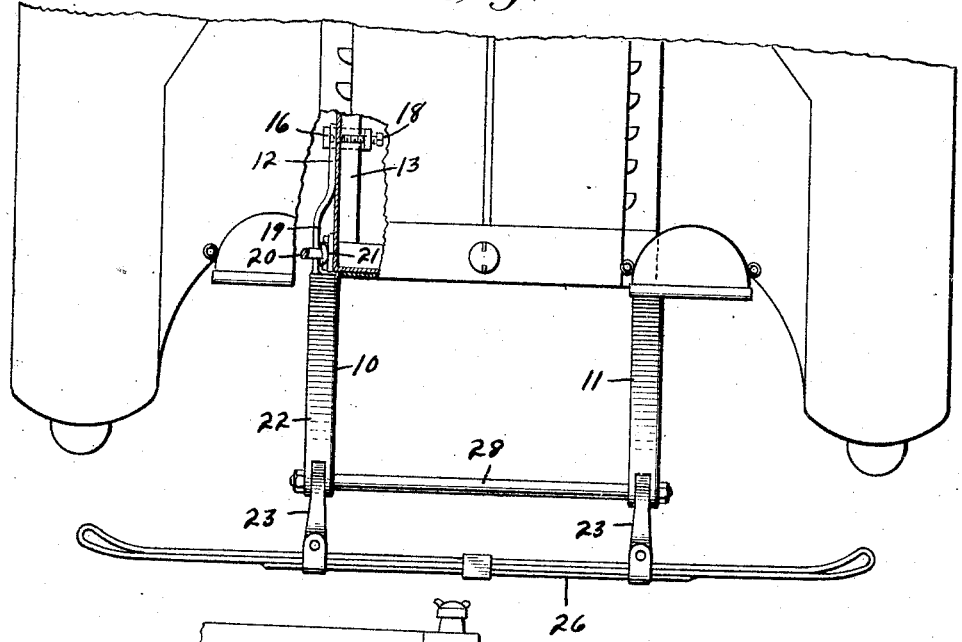
Fig. 2.
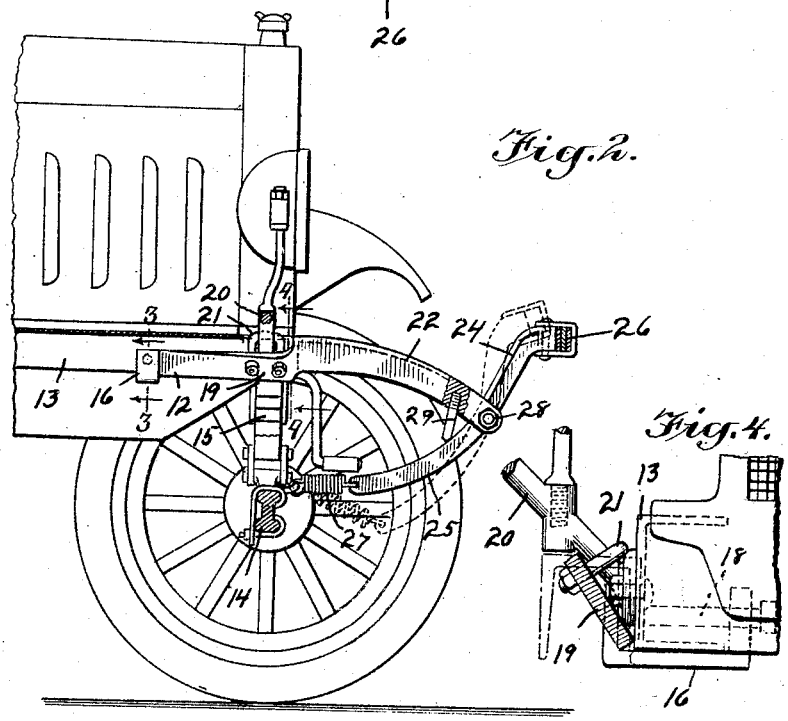
Fig. 3.
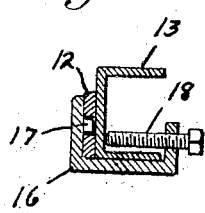
Fig. 4.
INVENTOR
Frederick E. Hutchings
BY
Dean, Fairbank, Wright & Hirsch
ATTORNEYS Patented June 2, 1925.

1,540,011

UNITED STATES PATENT OFFICE.

FREDERICK E. HUTCHINGS, OF BROOKLYN, NEW YORK, ASSIGNOR TO HUTCHINGS MANUFACTURING CO., INC., OF NEW YORK, N. Y., A CORPORATION OF NEW YORK.

AUTOMOBILE BUMPER.

Application filed March 6, 1922. Serial No. 541,444.

*To all whom it may concern:*

Be it known that I, FREDERICK E. HUTCHINGS, a citizen of the United States, and resident of Brooklyn, in the county of Kings and State of New York, have invented certain new and useful Improvements in Automobile Bumpers, of which the following is a specification.

This invention is an improvement in fenders or bumpers for use on vehicles, and is of that general type in which there is a transversely extending bumper bar supported by a pair of pivotally mounted arms.

My improved construction so far as concerns its main features, is particularly adapted for use with that type of automobile which has the front end of the chassis terminating substantially in the vertical plane of the front axle, the body bolster being supported above and spaced from said axle by a transversely extending semi-elliptical spring. The Ford may be mentioned as the most prominent example of that type of construction. The front knuckles or forwardly projecting downwardly curved ends of the side members of the frame, and the forwardly extending and upwardly curved ends of the pair of semi-elliptical springs which are connected to said elliptical springs are common features of most frame ends of automobiles, and their absence from the Ford gives it an individuality readily distinguishing it from most other makes.

One of the main features of my invention is to so design the bumper support that when attached it closely follows in position, design and appearance the front end portions of the frame and springs of most makes of cars and thus renders the support less conspicuous and the distinctive features of the car less noticeable.

A further object of my invention is to provide an improved means for the attachment of the supporting arms of bumpers to cars of any make.

A further object of my invention is to provide means whereby the relative elevations of the two ends of the bumper bar may be readily adjusted to bring the bar to substantially horizontal position, even though the supporting bars may be slightly bent or displaced.

In the accompanying drawings:—

Fig. 1 is a top plan view of a construction embodying my invention, portions of the car being broken away.

Fig. 2 is a side elevation partly in section, and

Figs. 3 and 4 are sectional details on the lines 3—3 and 4—4 respectively of Fig. 2.

In the specific form illustrated there are provided a pair of supporting bars 10 and 11 which may be made as a right and a left, and which are adapted to be secured to the side members of the frame. Each bar includes a substantially flat rear plate portion 12 adapted to lie alongside of and be clamped to the side channel member 13 of the chassis in the rear of the front axle 14 and the front transversely extending semi-elliptical spring 15. For clamping this bar portion 12 in position without necessitating the drilling of any holes in the frame, or otherwise altering it, I provide a substantially U-shaped clamp 16 which receives the lower side of the channel 13 and the bar 12. The outer upwardly extending arm of this clamp has a projection lug or stud 17 adapted to extend into or engage with a depression or recess in the bar 12, so as to prevent relative vertical movement of the bar and clamp. The other upwardly extending arm of the U-shaped clamp carries a screw bolt 18 which extends inwardly above the lower flange of the channel so as to engage with the inner surface of the web of the channel and firmly hold the bar 12 in position between the clamp and the outer surface of the channel web.

Each of the bars 10 and 11 has an intermediate portion 19 which is so formed as to lie in an inclined plane beneath the bracket 20 which supports the mud guard and the lamp. This inclined portion 19 has a U-bolt 21 with the loop thereof encircling the bracket 20 and the ends projecting through the bar portion 19 and receiving threaded nuts whereby the bar is rigidly clamped in position. Each of the supporting bars 10 and 11 has a forwardly and downwardly projecting portion 22 which is substantially in the form of an inverted channel and which is mounted to lie approximately in alignment with the side member 13 of the frame. This bar portion corresponds in position, curvature and general appearance to the forwardly extending side members of the chassis of those cars which have separate longitudinally extending semi-elliptical front springs. Pivotally connected to each of the two bars 10 and 11 are a pair of bumper supporting arms 23. Each of these arms has its pivotal support intermediate of its ends, and presents an upwardly and forwardly extending portion 24 and a downwardly and rearwardly extending portion 25. To the front ends of the two arms there is secured any suitable form of bumper bar 26. Preferably this is made of spring steel stock which will yieldingly resist distortion in a horizontal direction, and which is substantially rigid vertically. I have shown the bar of triple thickness at its center portion, and provided with rearwardly curved looped ends. I do not wish to be limited to this type or construction of bar.

The downwardly and rearwardly extending portions 25 of the bumper supporting lever arms are curved so as to lie in substantially the same position as to the front ends of the usual semi-elliptical springs. These lever arm portions terminate at substantially the elevation of the upper side of the axle 14, and are each connected to said axle by a coil spring 26. These springs are comparatively stiff so as to normally hold the lever arms 23 substantially rigid. As the springs are in alignment with the rear portion of the lever arms they are comparatively inconspicuous and the supporting parts 10 and 11 and the rearwardly extending lever arm portions 25 tend to make the car closely resemble in appearance the ordinary car with the separate springs at the front which extend forwardly from the axle.

In case of a collision the bumper bar may yield, due to its specific construction and the material of which it is made, and the bar may also move rearwardly as indicated in dotted lines in Fig. 2. This rearward movement is resisted by the springs 27. Due to the fact that the main component of the initial movement of the rear ends of the lever arms is downwardly or in a direction at a very considerable angle to the general direction of the springs, it will be noted that the initial rearward movement of the bumper bar results in a comparatively small elongation of the springs. The farther the bumper bar moves rearwardly the less becomes the vertical component, and the greater becomes the horizontal component of movement of the rear ends of the lever arms, so that the resistance to rearward movement of the bumper bar rapidly increases.

I have shown the pivotal supports of the bumper supporting lever arms in the form of a bar 28 which connects the front ends of the bars 10 and 11 and holds them rigid in respect to each other. This bar 28 gives the construction added rigidity and strength, and in itself forms a supplemental bumper bar which comes into action after the main bumper bar 26 has been moved rearwardly to such an extent that the person or object which has been struck may engage with the bar 28. This bar 28 may if desired be omitted and replaced by a pair of separate pivot bolts.

Each of the bars 10 and 11 adjacent to its front end carries an adjustable pin or stop 29 on its under side, and in the path of movement of the lever arms 23. The springs 27 hold the lever arms firmly against the ends of these stops. In case any of the parts become slightly bent or displaced, or if for any other reason the bumper bar is not at the same elevation at both ends when at rest, one or both of the pins may be adjusted to permit a swinging movement of one lever arm in respect to the other to bring the bumper bar to the desired adjustment.

Although the bars 10 and 11 are connected to the frame above the spring 15 and the lower ends of the arms 23 are connected to the axle below the spring 15, it will be apparent that there will be no relative movement of the supporting bars and lever arms during normal deflection of the spring 15, as the lever arms are held against the stops 29 and the relative movement of the axle and bolster is taken up by a swinging movement of the springs 27. In some constructions the lever arm portions 25 may be made very much shorter so as to terminate adjacent to the ends of the stops 29. In such case the springs 27 instead of being connected to the axle may extend upwardly or upwardly and rearwardly and have their upper ends secured within the channel portion 22. In this way the springs may be substantially concealed from view.

With my improved form of supporting bars it will be noted that rearward or endwise movement of the bars is effectively prevented by the U-bolts 21, an upward movement of the rear end portion 12 is prevented by the lug or projection 17, and a downward movement is prevented by the screw bolt 18. Thus the parts are rigidly and effectively locked in place without necessitating any change or alteration in the construction of the normal parts of the car.

Having thus described my invention, what I claim as new and desire to secure by Letters Patent is:—

1. An automobile bumper adapted for application to automobiles having a front body bolster and supporting spring both disposed in the vertical plane of the front axle, said bumper including a pair of bars projecting forwardly from the opposite ends of the bolster and curved downwardly at their front ends, lever arms pivoted intermediate of their ends to the front ends of said bars, and each including a downwardly and rearwardly extending curved portion and an upwardly and forwardly extending portion, springs connecting the rear ends of the first mentioned portions to the axle and a bumper bar carried by said second mentioned portions.

2. A bumper for automobiles of the type in which there are no frame parts projecting forwardly materially beyond the axle and in which the front body bolster is connected to the axle by a transversely extending semi-elliptical spring in the vertical plane of said axle and bolster, said bumper including a pair of bars projecting forwardly from the opposite ends of said bolster, lever arms pivoted intermediate of their ends to the front ends of said bars, springs connecting the rear ends of said lever arms to the axle and a bumper bar carried by the front ends of said lever arms.

3. An automobile bumper including a bumper bar, a pair of lever arms carrying said bar, means for supporting said lever arms intermediate of their ends, and springs connecting the oppposite ends of said levers to the axle of the vehicle.

4. A bumper for automobiles of the type in which there are no frame parts projecting forwardly materially beyond the axle and in which the front body bolster is connected to the axle by a transversely extending semi-elliptical spring in the vertical plane of said axle and bolster, said bumper including a pair of bars rigidly secured to the body and projecting forwardly from the ends of the bolster, levers pivoted intermediate of their ends to the front ends of said bars and movable in parallel vertical planes, a bumper bar carried by the front upper ends of said levers, and springs connected to the lower rear ends of said levers for resisting rearward movement of said bumper bar.

5. A bumper support for automobiles including a bar having a substantially flat rear portion adapted to be secured to the side of the frame, an intermediate portion disposed in a slightly inclined position and adapted to be clamped to the under side of the mud guard supporting bracket, a forwardly extending downwardly curved front portion, and a lever arm pivoted intermediate of its ends to the front end of said bar.

6. An automobile bumper, including a bumper bar, a pair of supporting bars therefor, and means for securing the rear end portions of said bars to the automobile frame, including substantially U-shaped clamps each having a projection upon one arm portion adapted to engage with the supporting bar, and a screw bolt extending through the other arm portion for engagement with the frame.

7. An automobile bumper adapted to be secured to the substantially channel shaped frame member of an automobile, said bumper including an impact portion and a supporting portion in the form of a substantially flat bar adapted to engage with the outer surface of the web portion of the frame, and a U-shaped clamp having upwardly extending terminal portions, one of said portions carrying a screw bolt adapted to engage with the inner surface of the web of said channel, and the other of said portions having a projection adapted for interlocking engagement with said bar.

Signed at New York in the county of New York and State of New York this 3rd day of March, A. D. 1922.

FREDERICK E. HUTCHINGS.